Aug. 16, 1927.
W. H. POTTER
1,639,270
SAUSAGE MAKING MACHINE
Filed Feb. 6. 1925
5 Sheets-Sheet 1
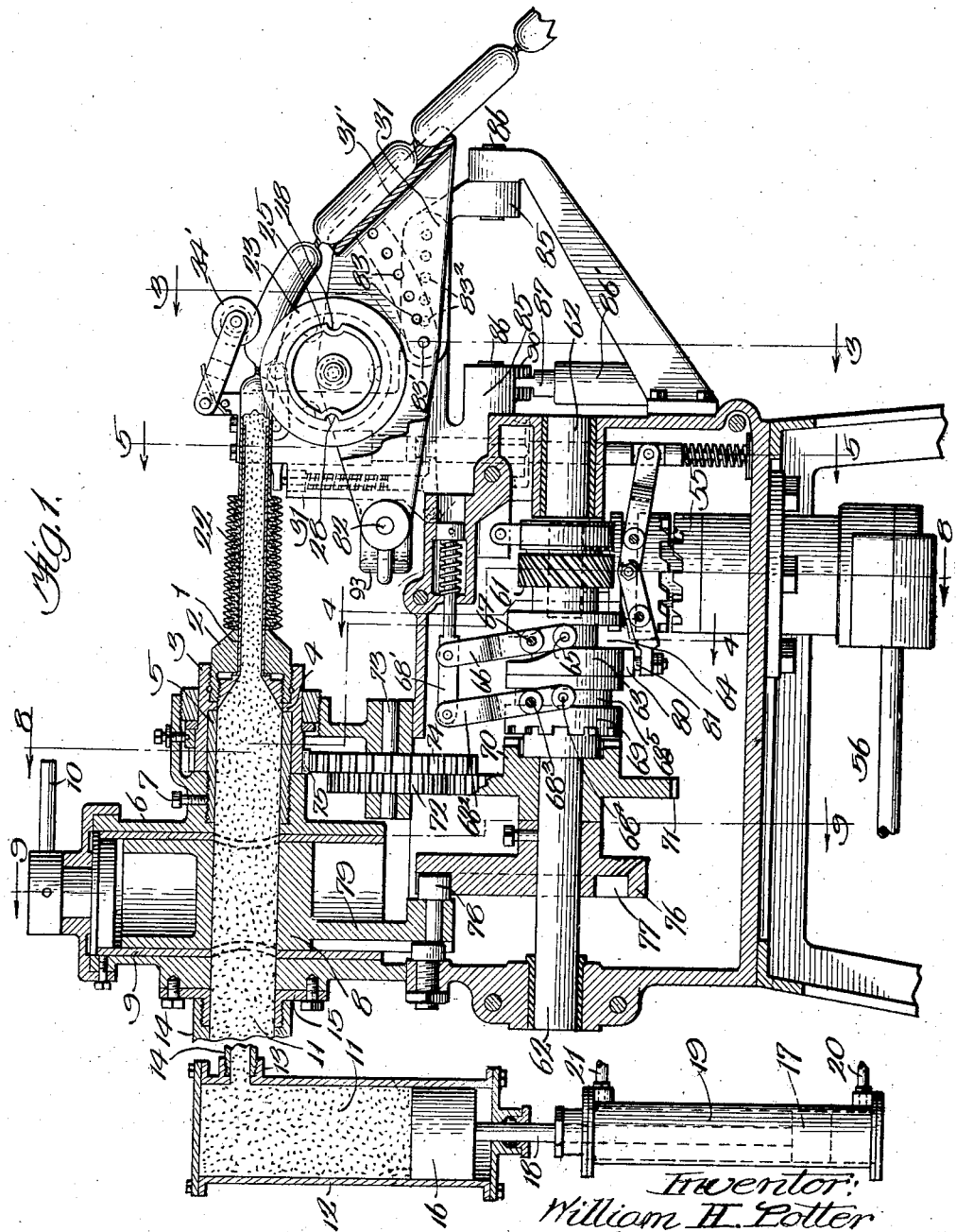

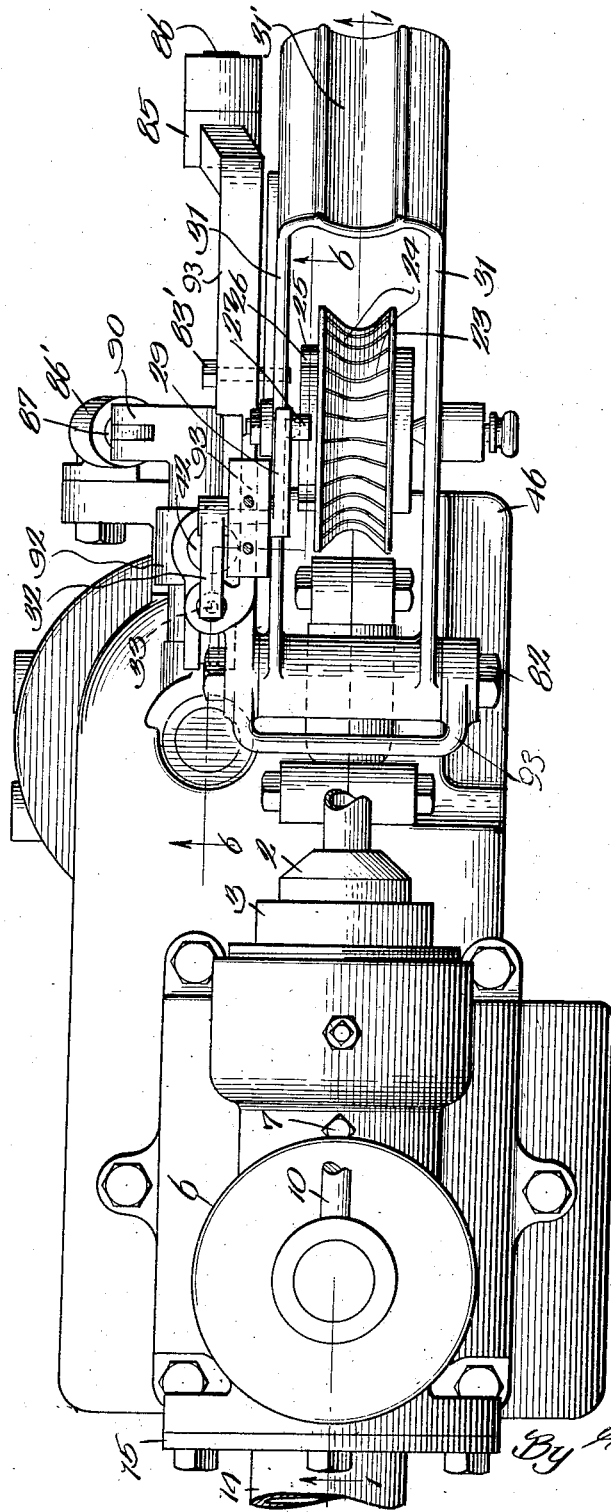

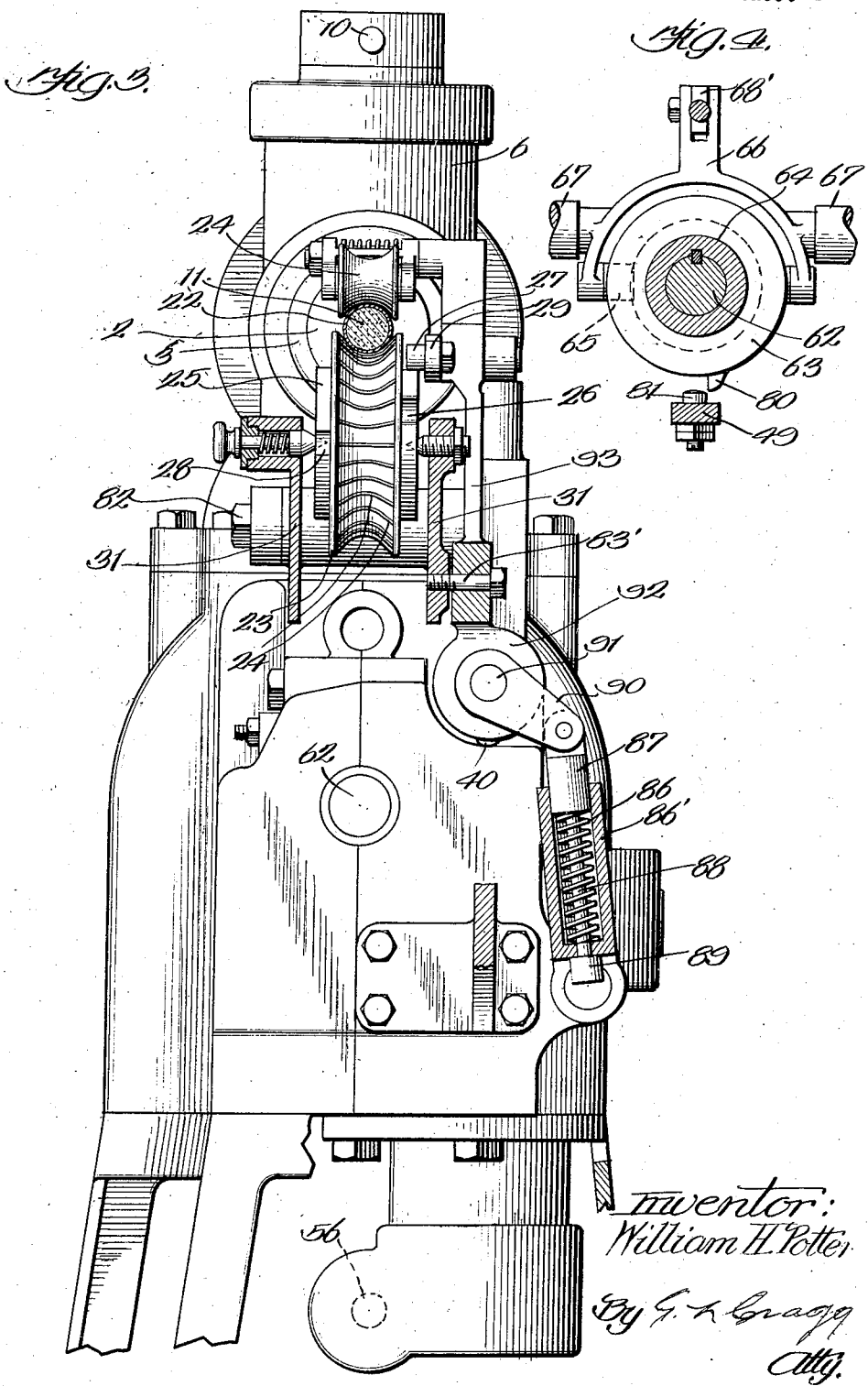

Aug. 16, 1927.
W. H. POTTER
1,639,270
SAUSAGE MAKING MACHINE
Filed Feb. 6, 1925    5 Sheets-Sheet 4
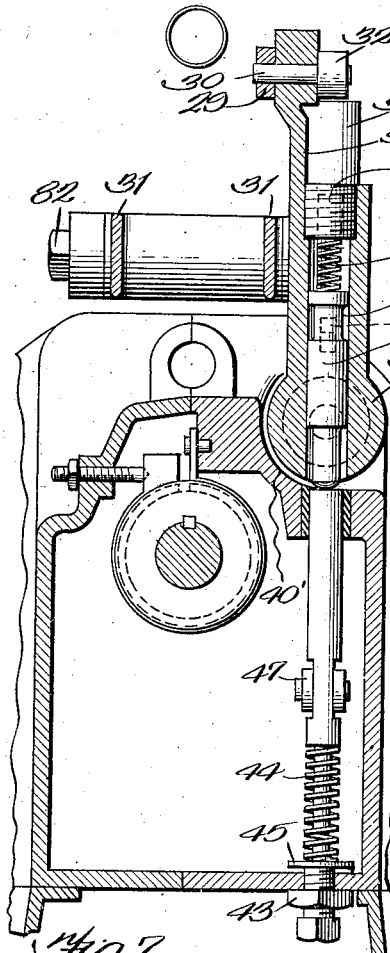
Inventor:
William H. Potter
By G. L. Cragg
atty

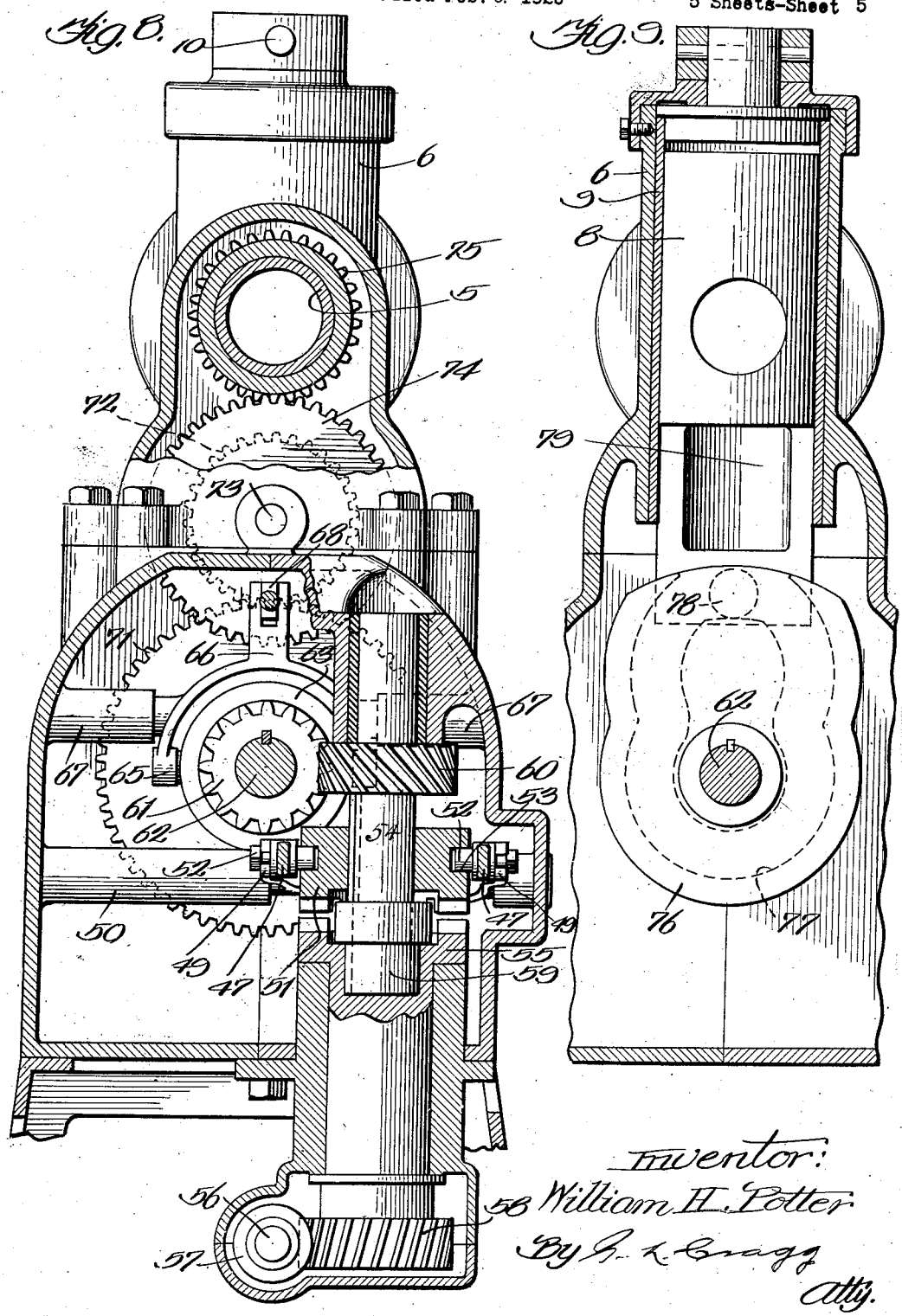

Patented Aug. 16, 1927.

1,639,270

UNITED STATES PATENT OFFICE.

WILLIAM H. POTTER, OF CHICAGO, ILLINOIS.

SAUSAGE-MAKING MACHINE.

Application filed February 6, 1925. Serial No. 7,347.

My invention relates to machines for exuding material, such as sausage making machines, though the invention is not to be thus restricted. The invention has for its object the provision of mechanism, to be operated by the exuded material, for placing successive or sub-dividing formations or markings upon material in its passage from the machine.

In a sausage making machine, as the invention is preferably practiced for making sausage in links, provision is made for discharging the meat into the sausage casing which is slipped upon a hollow open ended spindle through which the meat leaves the machine and enters the casing. The casing is contracted at intervals to form the sausage into links, this contracting of the casing being desirably accomplished by twisting the casing at intervals after it has left the spindle. In order that this twisting may be accomplished the spindle is preferably mounted to turn to twist the casing, the spindle then constituting a hollow open ended mandrel. Gearing is employed for intermittently turning the mandrel, this gearing being preferably governed by a wheel or pulley driven by the sausage as it leaves the machine and having a grooved periphery to hold the sausage in its plane while being turned thereby. The governing wheel may be constructed to cause the sausage to be twisted in uniform lengths. As the mechanism for forcing the meat into the sausage casing is desirably uniformly operated, all of the sausage links may not only be of equal length but also of equal weight. The invention, however, is not to be limited to this uniformity in the product.

The feeding of the meat is preferably caused to cease during each twisting operation upon the sausage and to this end I employ a valve which cuts off the flow of the meat when the twisting occurs. This valve is controlled by intermittently functioning mechanism also governed by the sausage operated wheel to close the valve when the twisting occurs. It sometimes happens that the machine may become jammed while this valve is open and I therefore employ a manually operated valve to obstruct the flow of meat through the open valve when necessity arises. This manually operated valve is desirably in the nature of a ported cylindrical sleeve surrounding the other valve, which is also cylindrical and has a transverse port therethrough through which the meat is delivered to the machine when this valve is open and which port can be closed by turning the hand valve, for the purpose stated.

While the machine of my invention is of particular utility in the formation of sausage, it must be apparent to those skilled in the art that it need not be limited to the formation of this product.

The invention will be more fully explained in connection with the accompanying drawings in which Fig. 1 is a view in elevation, mainly in section, on line 1—1 of Fig. 2, illustrating a machine as it is preferably constructed for the manufacture of sausage; Fig. 2 is a plan view; Fig. 3 is a sectional view on line 3—3 of Fig. 1; Fig. 4 is a sectional view on line 4—4 of Fig. 1; Fig. 5 is a sectional view on line 5—5 of Fig. 1; Fig. 6 is a sectional view on line 6—6 of Fig. 2; Fig. 7 is a view, on a larger scale, of a part of the mechanism as it is illustrated in Fig. 1 with the governing wheel shown in section and with parts shown in changed positions; Fig. 8 is a sectional view on line 8—8 of Fig. 1; and Fig. 9 is a sectional view on line 9—9 of Fig. 1.

The hollow cylindrical spindle 1 is open at both ends and is mounted within the bore of an intermittently rotated head 2, the spindle thus being constituted a mandrel. The head 2 is screwed into the forward end of the intermittently rotated sleeve 3 and against the inner annular shoulder 4 within this sleeve. The sleeve 3 turns upon another sleeve 5 entering the same from the rear end thereof and abutting said shoulder 4. The sleeve 5 is screwed into the stationary valve casing 6 and is held from rotation by means of a set screw 7 passing through the valve casing into abutting engagement with the sleeve 5. The valve casing 6 has a passage or port therein that is aligned with the bores of the aforesaid sleeves and with the mandrel 1. The passage through the valve casing is intermittently closed by a cylindrical plunger valve 8 which reciprocates vertically and is lowered to a closing position at intervals, as will appear. This valve is surrounded by a cylindrical sleeve valve 9 having ports in its opposite sides, the valve 9 being mounted to turn in a fixed plane to open or close the passage through the valve casing and to close the port extending diametrically and transversely through the valve 8 when this valve is elevated to bring its port into register with the passage in the valve casing and the bores in the mandrel and the sleeves contiguous to the mandrel. The valve 9 has a handle 10 suitably assembled therewith to enable this valve to be operated when required when the flow of meat is to be stopped while the valve is open. The meat or other material indicated at 11 is sufficiently fluid to enable it to be forced through the valve casing and the mandrel. Any suitable means may be employed for effecting the flow of the material. Such means is shown in Fig. 1 at the left thereof and on a much smaller scale than the balance of Fig. 1, due to lack of space. The illustrated means is inclusive of a large feeding cylinder 12 having a lateral outlet 13 at its upper end into which one end of a discharge pipe 14 is screwed, the other end of this discharge pipe being screwed upon a boss 15 that is carried upon a side of the valve casing 6, the outlet 13, the pipe 14 and the boss 15 being aligned with the passage in the valve casing. A piston plunger 16 is moved upwardly in the cylinder 12 by some suitable agency, preferably by means of another piston 17 coupled therewith by means of a rod 18 and moving within a cylinder 19 into which air is admitted under sufficient pressure through the pipe 20 to force the pistons upwardly, the air above the piston 17 being displaced through the pipe 21. The means for forcing the meat from the cylinder 12 is thus yielding to avoid breakage or undue jamming.

If the machine is employed to pack material into casings as in the production of sausage, for example, the casing 22 is slipped upon the mandrel and is bunched thereon to be withdrawn therefrom as required in the formation of the sausage. In starting the machine into operation a small portion of the casing projects beyond the mandrel and is twisted or otherwise contracted at its projecting end to close the same at this end so that as the meat is exuded from the mandrel it will press against the sausage casing and draw the same from the mandrel to an extent corresponding with the amount of meat discharged. When the required amount of meat has been disposed within the desired length of sausage casing, the casing is again twisted at the discharge end of the mandrel, whereupon the formation of a succeeding link of sausage ensues. During the twisting operation the flow of meat should cease, a result which is effected by the downward movement of the plunger valve 8 effected by mechanism that will later be described.

A peripherally grooved wheel or pulley 23 turns upon a horizontal axis within the path or plane of travel of the sausage as it issues from the mandrel, the sausage entering the peripheral groove in the wheel and thereby serving to turn the wheel, there being desirably roughened or ridge formations 24 within the groove of the wheel to enable the sausage to have tractive engagement with the wheel. This tractive engagement may be reinforced by a downwardly spring pressed idler roller 24′ engaging the top of the sausage. The wheel serves to effect the intermittent turning of the mandrel and the substantially simultaneous closure of the valve 8 whenever the sausage casing is to be twisted. The wheel illustrated is formed with two shoulders 25, 26, projecting from opposite sides thereof, these shoulders being cylindrical and coaxial with the wheel and one or the other cooperating with a roller or pin 27 placed upon one side of the plane of rotation of the wheel. The shoulder 25 has two depressions 28 that are diametrically opposite. The shoulder 26 has three such depressions preferably equally spaced. If the wheel is positioned, as illustrated, with the shoulder 26 in the plane of the pin 27, the pin will fall successively into the depressions 28 three times for each revolution of the wheel. If the wheel is reversed the pin will fall twice for each revolution of the wheel. Two sausage links per revolution of the wheel or three sausage links per revolution of the wheel may result, according to the shoulder that is presented to the pin, the lengths of the sausage links being thus regulable.

The machine of my invention is capable of producing sausage links of equal length when the notches 28 are equally spaced apart. However, if it is desired to produce links of different lengths the notches 28 may be correspondingly unequally spaced apart. The advantages of my machine in the production of sausage or other products will be apparent to those skilled in the art.

The pin 27 is carried upon one end of an arm 29 pivoted at 30 upon the wheel carriage 31 having a chute 31′ that guides the sausage from the machine. Another arm 32 is rigidly coupled with the arm 29 by the shaft 30. The pin 27 is maintained in engagement with the shoulder 26, by means of a plunger 33 which is pressed upwardly upon by an arm 34, the upright plunger 33 being surrounded by a coiled spring 35 whose upper end abuts against a bushing 36 that is screwed into the upper end of the hollow continuation 37 of the carriage 31. The lower end of this spring abuts against the lower and enlarged end of the plunger 33 whereby the plunger is maintained in engagement with the hump 38 provided upon the top side of the arm 34. The arm is mounted to turn, at one end, upon the carriage, the other end of the arm entering a wide annular groove 39 in the upright plunger 40 that may move within a guiding passage formed in the carriage 31. The plunger 40 is pressed downwardly upon by a coiled spring 41 whose upper end abuts against a plug 42 screwed in the top side of the carriage and whose lower end abuts against the top of the plunger 40. The bottom of the plunger 40 engages the top of an upright plunger 43 that is normally aligned with the plunger 40 and is pressed upwardly upon by a coiled spring 44 whose lower end abuts against a vertically adjustable abutment 45 carried by the frame 46. The spring 44 operates through the plungers 43 and 40, the arm 34 and the plunger 33, to hold the pin 27 upon the corresponding shoulder 26. The spring 41 offsets the action of the spring 44 sufficiently to prevent the latter spring from pressing the pin too forcibly against the shoulder engaged by it. The spring 35 is light, being just sufficiently strong to maintain the plunger 33 in engagement with the hump 38. Whenever the pin 27 drops into a recess 28 through the action of the spring 44 operating through the elements 43, 40, 34, 33, 32, 30 and 29, the clutch lever 47 is raised, this clutch lever being pivotally connected with the plunger 43 at one end and having a stationarily located shaft 48 near its other end. This clutch lever is in pin and slot connection with another clutch lever 49 having a stationarily located shaft 50. Both clutch levers are in the nature of semi-circular rings together constituting a flexible collar which embraces the clutch member 51. The clutch lever 47 carries the pins 52 received in slots in the adjacent ends of the clutch lever 49. These pins 52 project into an annular groove 53 provided in the clutch member 51, this clutch member being in the nature of a collar splined upon the shaft 54 so as to be movable therealong in either direction while turning therewith. When the clutch lever 47 is lifted at the end thereof which is connected with the plunger 43, this clutch lever and its complement 49 are depressed where the pins 52 that couple them are located. The clutch member 51 is consequently moved downwardly along the upright shaft 54 into engagement with the clutch member 55 which is constantly power driven, as through the motor driven shaft 56, the worm 57 on this shaft, the worm wheel 58 in mesh with the worm, and the shaft 59 carrying the worm wheel and the clutch member 55. The worm wheel 60 is fixed upon the shaft 54 and is in mesh with a worm wheel 61 that is fixed upon a shaft 62.

Whenever the pin 27 drops into a notch or depression 28 the shaft 62 is driven, as will be clearly apparent. This shaft carries a cam 63 having a surrounding cam groove 64 which receives the pins 65 upon the bifurcated end of a clutch lever 66 which is stationarily pivoted at 67. The cam 63 is splined upon the shaft 62 to turn therewith and to be movable longitudinally thereof. A spring 68 presses upon the cam 63 to the right through the intermediation of a rod 68' connected with the lever 66, Fig. 1. When the shaft 62 is turned the lever 66 is turned in opposition to this spring and forces the movement of the cam 63 to the left. When thus moved to the left the cam 63 moves the clutch member 69 to the left into engagement with a clutch member 70 that is journaled loosely upon the shaft 62. The clutch member 70 carries a spur gear 71 which meshes with a spur gear 72 provided upon a shaft 73. Another spur gear 74 is also upon the shaft 73 and is in fixed relation with the spur gear 72. The spur gear 74 meshes with spur gear 75 that surrounds and is integrally formed with the sleeve 3. The head 2, being fixed with respect to the sleeve 3, is thus turned, together with the mandrel, each time the clutch member 51 is thrown into engagement with the clutch member 55. The shaft 62 also carries a cam disk 76 that is fixed thereon, this disk having a cam groove 77 in one face thereof. This cam groove receives a cam roller 78 that is carried by an extension 79 of the valve 8. When the shaft 62 is turned in the manner stated, the valve 8 is lowered to shut off the flow of meat during the twisting operation and is raised to re-establish the flow of meat when the twisting operation is concluded. This twisting operation is concluded when the clutch member 51 is separated from the clutch member 55, and this separation occurs when the cam 80 engages the pin 81 upon the left hand end of the clutch lever 49. The cam 80 acts through the clutch lever 49 to raise the pins 52 and thereby raise the clutch member 51. The clutch member 51 is raised, coincidently with the passage of the recess 28 that received the pin 27, out of register with this pin. The higher portion of the shoulder 26 continues in engagement with the pin 27 until the ensuing notch 28 is in register with the pin 27, whereupon the ensuing twisting and valve closing operations occur, the portion of the shoulder between the two notches 28 maintaining the plunger 43 in its depressed position against the force of the spring 44 and the lesser force of the spring 35, the spring 41 serving to offset the action of the spring 44 sufficiently to relieve excessive wear of the shoulder 26 upon the pin 27. The closure of the valve 8 and the twisting operation are substantially simultaneously effected and the reopening of the valve and the cessation of the twisting also substantially simultaneously occur, the clutch member 69 being disengaged from the clutch member 70 by the cam 63 assisted by the spring 68 whose rod 68' is also coupled with the clutch member $68^2$ stationarily pivoted at $68^3$ and carrying pins $68^4$ entering the groove 68⁵ in the clutch member 69. If the machine should be jammed or if for any other reason the flow of meat should be stopped while the pin is between adjacent notches 28, the hand valve 9 may be closed, to obstruct the flow of meat through the then open valve 8.

The carriage 31 is desirably mounted to swing upon the shaft 82 so that the height of the controlling wheel 23 may be regulated according to the diameter of the sausage that is to be formed. The carriage 31 may be maintained in its adjustment by means of a pin 83' inserted through the selected one of the openings 83 in the carriage and a registering opening 83² in the bracket 85. The bracket 85 is desirably mounted to turn upon the aligned horizontal shafts 86 disposed in the plane of travel of the sausage and carried in fixed locations upon the frame of the machine. If it should be desired to gain access to the outlet end of the mandrel, the bracket 85 and the carriage 31 thereon may be turned to one side in a plane transverse to the direction of travel of the sausage whereby the control wheel 23 may be moved to one side of the mandrel to afford access thereto. In this turning movement of the carriage the lower and rounded end of the plunger 40 will ride upon the track 40' to hold the pin 27 in engagement with the control wheel 23, the upward movement of the plunger 43 being prevented by the nut 43' thereon. The control wheel 23 is maintained in its normal position by means of a spring 86 housed within a spring barrel 86' and abutting at its lower end, against the lower end wall of this barrel. The upper end of this spring abuts and presses upwardly against the head 87 upon the rod 88 which has another head 89 engaging the bottom of the barrel 88 to limit the extent to which this spring may move the rod 88 upwardly, the head 89 defining the operating position of the wheel 23. The head 87 is linked to an arm 90 provided upon a shaft 91 which is journaled in the extension 92 of the carrier 93 for the wheel 23. This wheel is assembled with the carrier 93 by means of the carriage 31 assembled with the carrier by the shaft 82 and the pin 83'.

The term "hand valve" is used in the sense of any valve controlled at the will of the operator.

The operation of the machine will be understood from the foregoing description which sets forth in detail the inter-relation of many parts that are employed in controlling the supply of the sausage meat to the casing, the operations effected upon the filled casing to form the sausage into links, and the control effected by the sausage in passing, over the link twisting mechanism. The operation of the machine is, however, generally reviewed, as follows: The sausage meat is fed from the cylinder 12 into the hollow mandrel 1 when the reciprocable valve 8 is uppermost to establish a passage for the flow of meat from said cylinder to said mandrel. In preparing the machine for operation, the sausage casing is bunched upon the mandrel and the forward end thereof is tied to close it. As the flow of meat continues it pushes against the forward closed end of the sausage casing and thereby withdraws the sausage casing from the mandrel as the filling proceeds. As the sausage leaves the mandrel it turns the wheel 23 and this wheel effects the intermittent rotation of the mandrel by causing the intermittent rotation of the shaft 62 in the manner minutely described hitherto. This shaft 62, when it is turned, drives the pinion 75 upon the sleeve 3, with which sleeve the mandrel 1 turns. Whenever the mandrel is thus turned, the same shaft 62 causes the plunger valve 8 to lower, so that the flow of meat is cut off during the time that the mandrel is turned. Whenever the mandrel is turned the sausage casing thereon turns with it so that this casing is twisted just ahead of the mandrel to finish the formation of a link. This twisting having been accomplished, the mandrel is brought to rest and the plunger valve 8 is elevated, whereupon the flow of meat is resumed and the foregoing cycle of operations is commenced and repeated.

Changes may be made without departing from my invention.

Having thus described my invention, I claim:—

1. The combination with an open ended hollow spindle free to receive a casing thereon and to permit the casing to project and be pulled therefrom; of mechanism for passing material into the spindle and into the projecting portion of the casing; a wheel positioned to be turned by the filled portion of the casing in passing; and intermittently functioning mechanism for successively marking the portion of the casing passing from the spindle and operated by said wheel in turning.

2. The combination with an open ended hollow spindle free to receive a casing thereon and to permit the casing to project and be pulled therefrom; of mechanism for passing material into the spindle and into the projecting portion of the casing; a wheel positioned to be turned by the material passing from the spindle; and intermittently functioning mechanism for contracting at intervals the portion of the casing passing from the spindle, and operated by the wheel in turning.

3. The combination with an open ended hollow spindle; of mechanism for passing material through said spindle; a wheel positioned to be turned by the material in passing from the spindle; and intermittently functioning mechanism, apart from the wheel, for successively marking the material passing from the spindle and operated by the wheel in turning.

4. The combination with an open ended hollow spindle; of mechanism for passing material through said spindle; a wheel positioned to be turned by the material passing from the spindle; and intermittently functioning mechanism, apart from the wheel, for subdividing the material passing from the spindle and operated by the wheel in turning.

5. The combination with means for guiding the passage of material; of a wheel positioned to be turned by the material in passing; and intermittently functioning mechanism, apart from the wheel, for successively marking the passing material and opreated by the wheel in turning.

6. The combination with means for guiding the passage of material; of a wheel positioned to be turned by the material in passing; and intermittently functioning mechanism, apart from the wheel, for subdividing the passing material and operated by the wheel in turning.

7. The combination with means for guiding the passage of encased material; of a wheel positioned to be turned by the encased material in passing; and intermittently functioning mechanism for twisting at intervals the casing containing the material and operated by said wheel in turning.

8. The combination with an open ended hollow spindle free to receive a casing thereon and to permit the casing to project and be pulled therefrom; of mechanism for passing material into the spindle and into the projecting portion of the casing; a wheel positioned to be turned by the material passing from the spindle; and intermittently functioning mechanism for twisting at intervals the portion of the casing passing from the spindle and operated by the wheel in turning.

9. The combination with mechanism for guiding the passage of encased material; of a wheel positioned to be turned by the encased material in passing; and intermittently functioning mechanism for contracting at intervals the casing containing the material and operated by said wheel in turning.

10. The combination with mechanism for marking passing material; of means, including an actuating wheel, turning with reference to the mark applying portion of said mechanism and operating said mechanism, said wheel being operable by the passing material and operating said mechanism in turning.

11. The combination with mechanism for subdividing passing material into spaced apart bodies; of means, including an actuating wheel, operating said mechanism, said wheel being operable by the passing material and operating said mechanism in turning.

12. The combination with mechanism for twisting passing material into spaced apart bodies; of means, including an actuating wheel, operating said mechanism, said wheel being operable by the passing material and operating said mechanism in turning.

13. The combination with mechanism for marking passing material; of means, including an actuating wheel, turning with reference to the mark applying portion of said mechanism and intermittently operating said mechanism, said wheel being operable by the passing material and operating said mechanism in turning.

14. The combination with mechanism for subdividing passing material into spaced apart bodies; of means, including an actuating wheel, intermittently operating said mechanism, said wheel being operable by the passing material and operating said mechanism in turning.

15. The combination with mechanism for twisting passing material; of means, including an actuating wheel, intermittently operating said mechanism, said wheel being operable by the passing material and operating said mechanism in turning.

16. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; and a wheel positioned to be turned by the filled portion of the casing as it moves from the spindle, and operating, in turning, said intermittently functioning mechanism.

17. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle, and operating, in turning, said intermittently functioning mechanism; and mechanism for contracting the casing at intervals as it issues from the spindle and also governed by said intermittently functioning mechanism.

18. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle and operating, in turning, said intermittently functioning mechanism; and mechanism for twisting the casing at intervals as it issues from the spindle and also governed by said intermittently functioning mechanism.

19. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle and operating, in turning, said intermittently functioning mechanism; and mechanism for turning the spindle at intervals to twist the casing as it issues from the spindle and also governed by said intermittently functioning mechanism.

In witness whereof, I hereunto subscribe my name.

WILLIAM H. POTTER.